July 14, 1931. H. C. HAYES 1,814,444
GEOPHYSICAL METHOD AND APPARATUS
Filed May 15, 1928 7 Sheets-Sheet 1

Inventor
Harvey C. Hayes
By Attorney

July 14, 1931.  H. C. HAYES  1,814,444
GEOPHYSICAL METHOD AND APPARATUS
Filed May 15, 1928   7 Sheets-Sheet 2
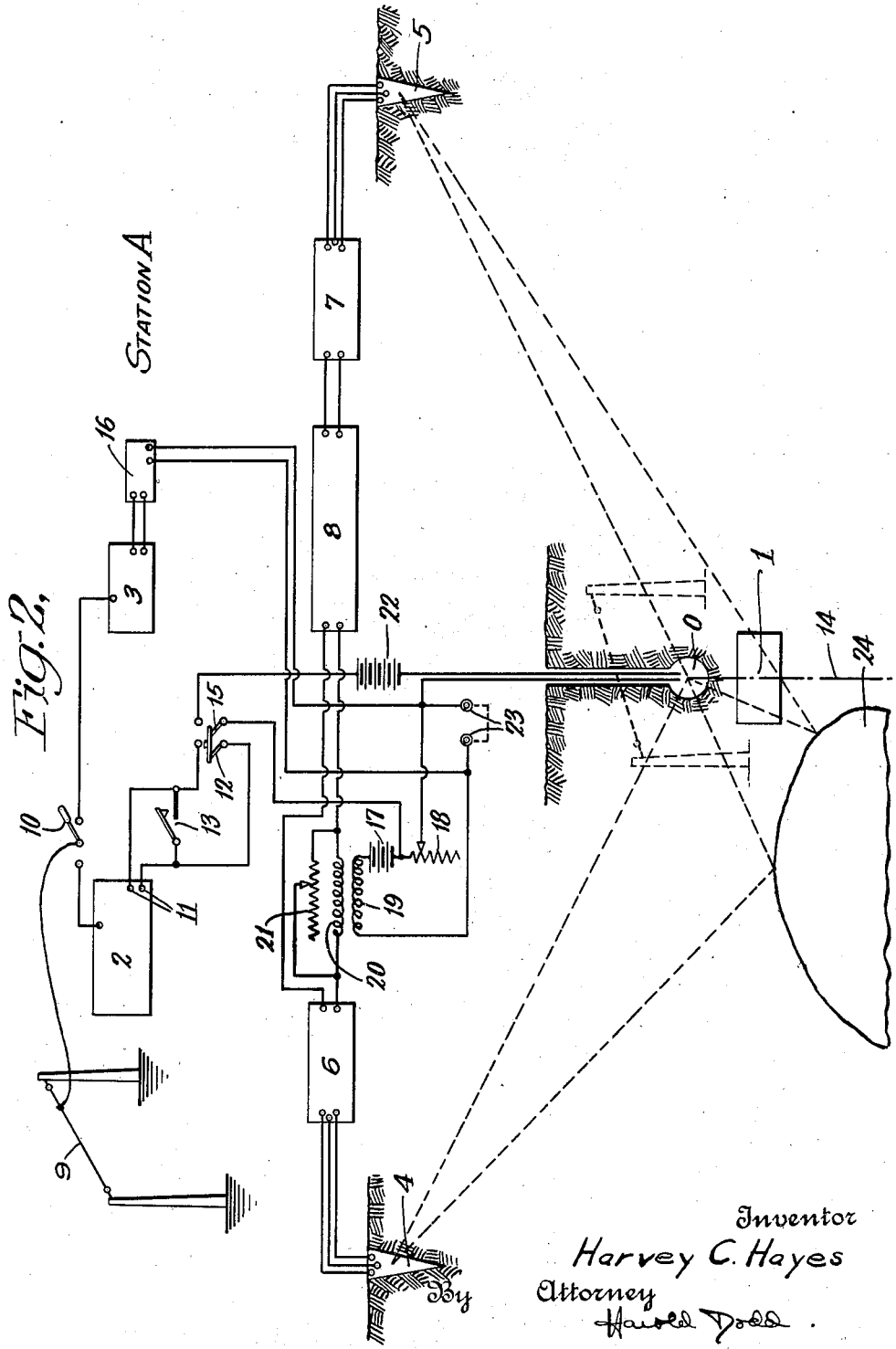
Inventor
Harvey C. Hayes
By Attorney

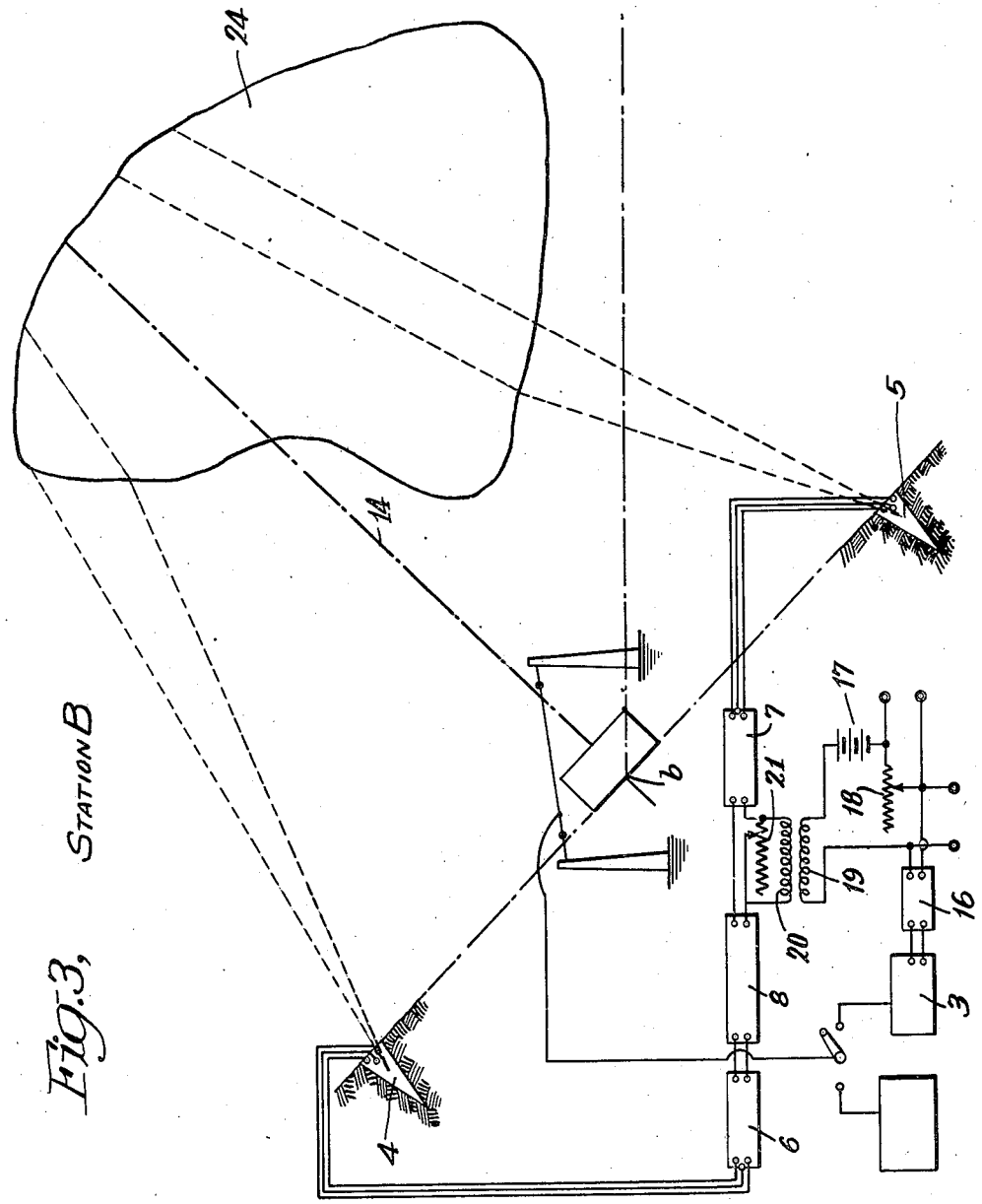

July 14, 1931.  H. C. HAYES  1,814,444
GEOPHYSICAL METHOD AND APPARATUS
Filed May 15, 1928   7 Sheets-Sheet 4
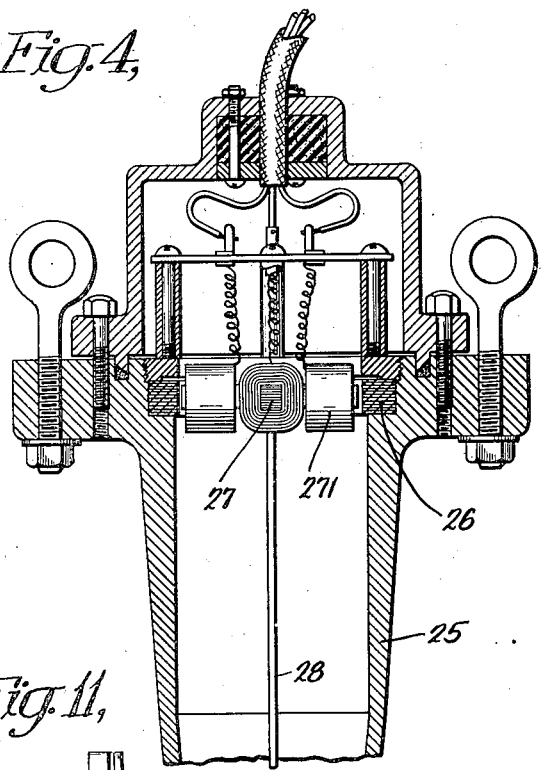
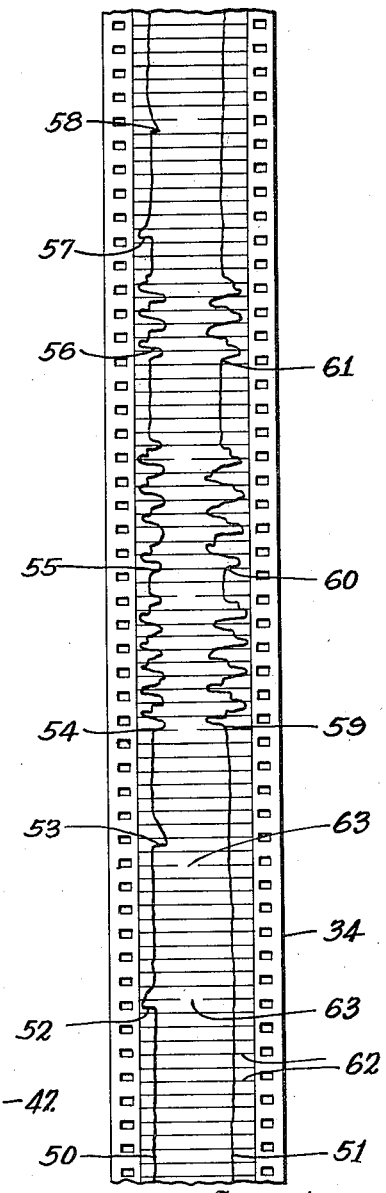
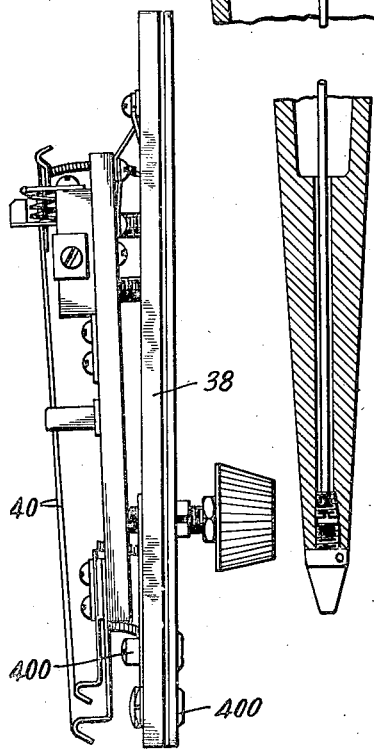
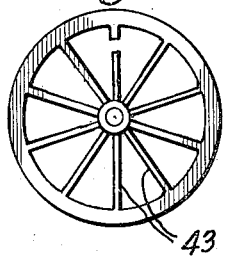
Inventor
Harvey C. Hayes
By Attorney

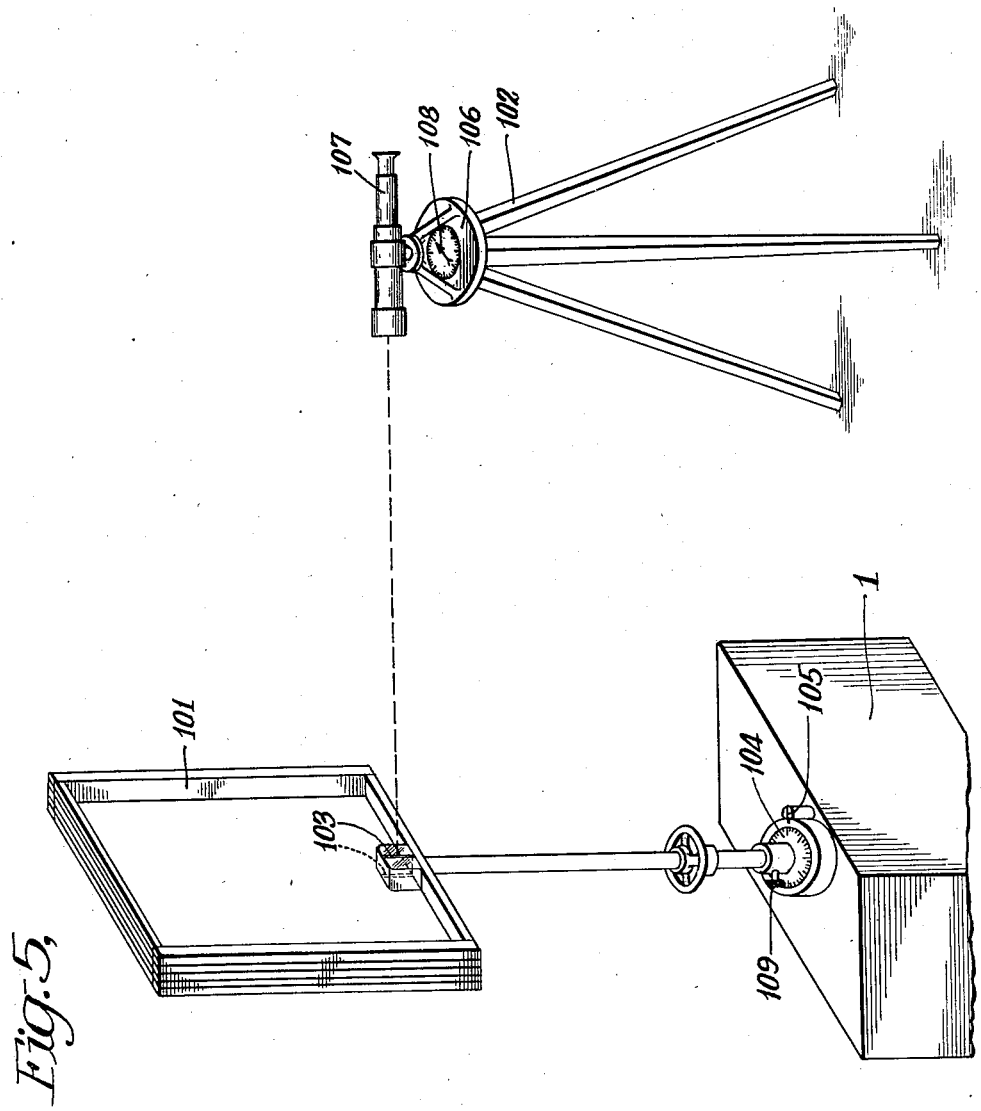

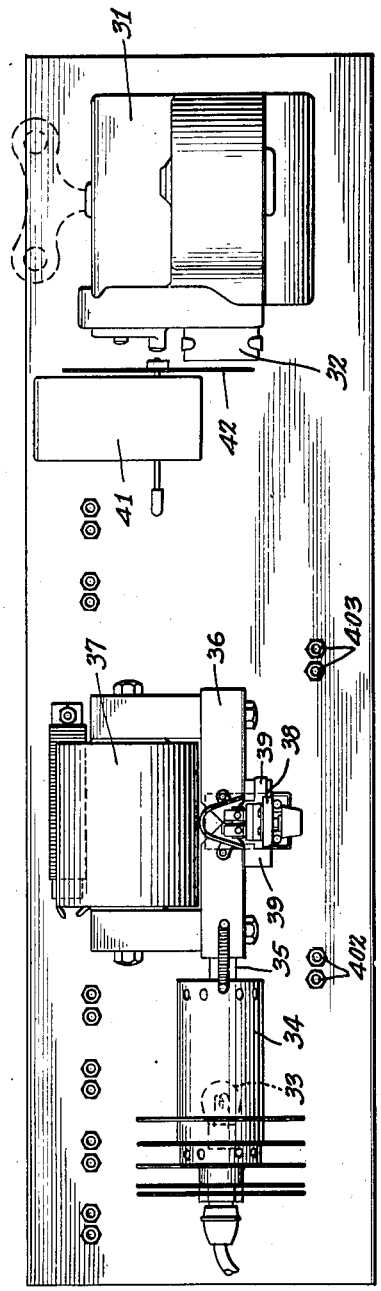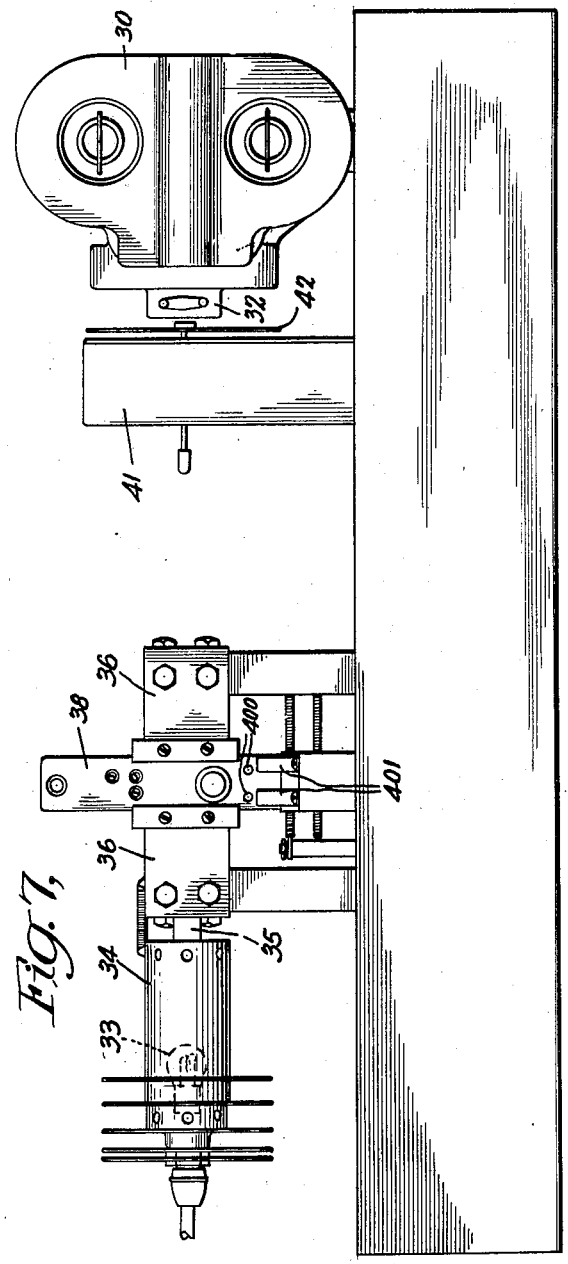

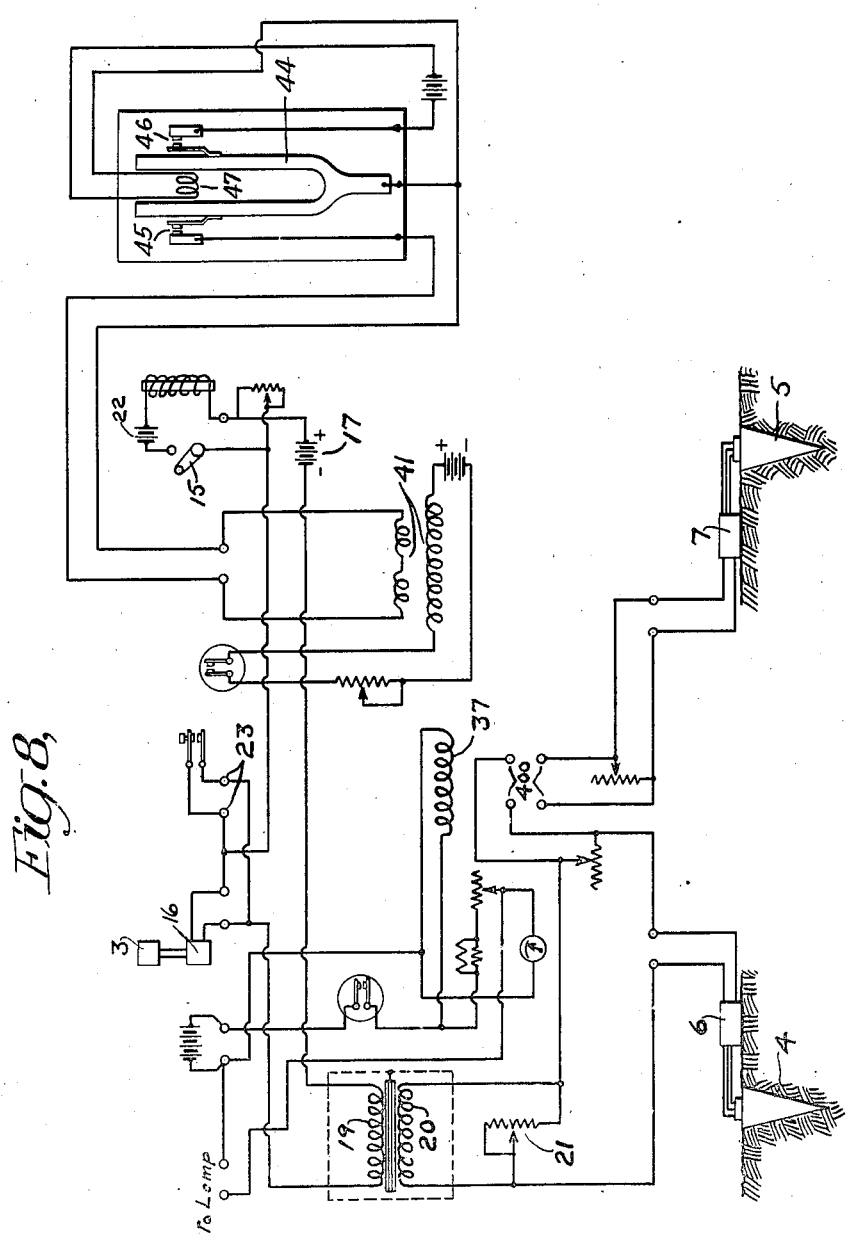

Patented July 14, 1931

1,814,444

UNITED STATES PATENT OFFICE

HARVEY C. HAYES, OF WASHINGTON, DISTRICT OF COLUMBIA

GEOPHYSICAL METHOD AND APPARATUS

Application filed May 15, 1928. Serial No. 277,966.

(GRANTED UNDER THE ACT OF MARCH 3, 1883, AS AMENDED APRIL 30, 1928; 370 O. G. 757)

During comparatively recent years, efforts have been made by parties interested in subterranean deposits of various kinds to determine the nature of the earth's surface over large sections of land without the necessity of drilling test holes, as has heretofore been the universal practice. Much time and money has been spent in the past by producers of oil, as well as those interested in other subterranean deposits, in the drilling of test holes which frequently bore no results. This old time procedure is very slow, and due to the need of drilling to such great depths has entailed considerable expense, all based on the bare possibility and not upon certainty of locating some valuable deposits. Of course, prior to the drilling of such test holes, it was the common practice to employ expert geologists to study surface conditions, which, together with available data of the section being explored, might serve to indicate the likelihood of the existence of the desired deposits, but such methods, for obvious reasons, are not fully satisfactory. It is frequently the case that a large pool of oil, for example, may be located beneath the earth's surface at a point where no indication of its existence is given at the surface.

For this reason, the practice has become more and more prevalent to study the geophysical characteristics of the earth's surface over large areas. It is well known, for example, that a frequently encountered geological structure that is suitable for the accumulation of oil is a salt dome which has certain peculiarities with respect to density and elasticity, as well as certain peculiar magnetic qualities. Working upon the basis of the differences in density of various geological strata, vast areas have been explored by means of torsion balances or similar devices which give an accurate determination of the relative values of the earth's gravitational pull at various points. Others, depending more upon the elastic qualities of the different earth formations, have resorted to means for setting up vibrations at selected points and detecting these vibrations at other points within a range of a few miles. The present invention has to do primarily with improvements in methods and apparatus depending upon these peculiar elastic qualities of various types of earth structure. It is contemplated by the present invention to simplify the exploration work of this character in such a way that it may be more rapidly carried on with greater assurance of accuracy in the results obtained and with the recording of a maximum amount of information regarding the character of the earth's surface through which the vibrations have travelled. With these and other incidental objects in view, such as will become more apparent as the detailed description progresses, a preferred form of embodiment of the invention will now be described in detail with reference to the accompanying drawings in which Figure 1 is a diagrammatic view showing the general arrangement of sending and receiving stations employing the improved methods and apparatus.

Figure 2 is a diagrammatic view showing in greater detail of the instruments employed at the sending station.

Figure 3 is a diagrammatic view showing of the instruments employed at a receiving station.

Figure 4 is a sectional view of one of the detectors employed.

Figure 5 is a perspective view of the radio compass and transit as set up to determine a bearing.

Figure 6 is a plan view of the oscillograph and tuning fork control.

Figure 7 is an elevational view of the oscillograph.

Figure 8 is a wiring diagram of the oscillograph and related elements.

Figure 9 is a detail of a section of the photographic record.

Figure 10 is a detail of the wheel for forming time lines.

Figure 11 is a side view of the holder for the oscillograph strings.

Figure 1:
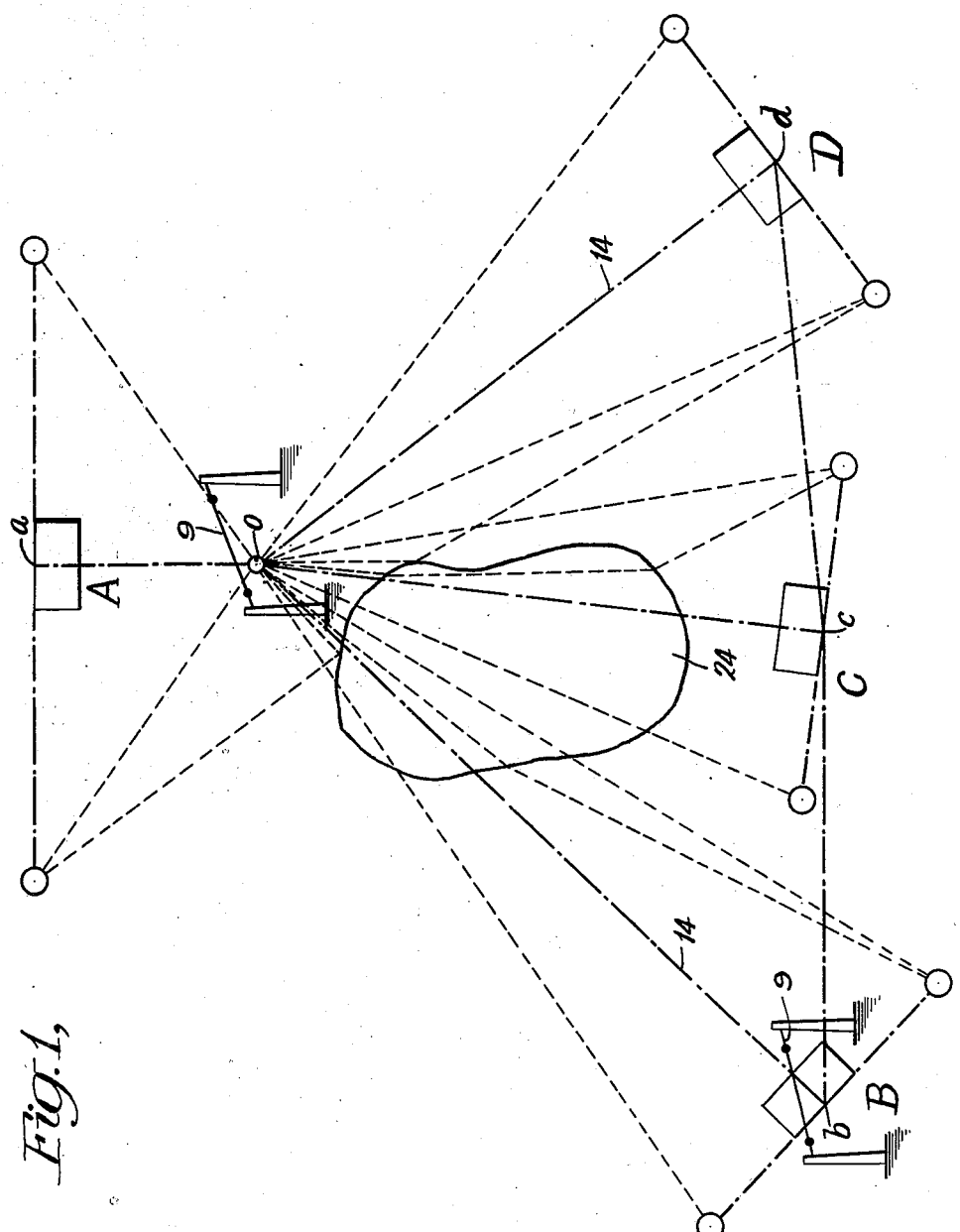

Referring now to Figure 1, the invention contemplates the creation of vibrations similar to sound waves by any suitable means as by setting off an explosive charge at a point which has been designated O. This charge may consist of any suitable detonating material, such as dynamite or explosive gelatin, in quantities which will vary with the nature of the earth being explored, and with the distances adopted between the various stations. The explosive charge will preferably be placed some distance below the surface of the earth in a hole from 3 to 6 inches in diameter, which may be drilled by any suitable means. In determining the depth at which the explosive charge shall be set off, the important factor is the prevention of loss in the power of the charge through the undue blowing out of an opening immediately above the charge. Compressional waves similar to sound waves but probably of a frequency below the range of audibility, will be set up upon the explosion of the charge and will radiate in all directions. Obviously it will be advantageous to retain as much as possible of this vibrational energy within the earth itself and to prevent its escape into the free air above the charge.

At a point designated A, which is near the point of explosion, preferably about 1,000 feet from the latter, the equipment constituting what will be termed the sending station, is set up, while at points B, C, and D, which are at a greater distance, preferably 4 or 5 miles from the source of explosion, the apparatus comprising the several receiving stations will be set up. These receiving stations may be located in any suitable manner with respect to each other, but preferably will be located substantially along a straight line and at a distance of 1 to 1½ miles apart. While three receiving stations have been illustrated in Figure 1, it will be obvious that a greater or less number may be employed, one station being sufficient if desired, while a greater number than three is preferable in order to take readings over as much of the territory affected by the charge as possible. If sufficient equipment were available, it would be desirable to arrange a complete series of stations, either in a circle about the point of explosion or along the four sides of a square, having the point of explosion at its center. Substantially the same equipment is required at all of the stations, including the sending and receiving stations, and while some differences exist between the sending and receiving outfits, it is desirable to equip all of the stations alike to render them interchangeable.

Considering now the equipment at the several stations, each is provided with a radio compass 1, which includes a balanced loop receiver and any suitable form of sensitive radio receiving apparatus. A radio transmitter 2 is also provided at each station together with a radio receiver 3, which, among other things, may be used for intercommunication between the stations. Two vibration or sound detectors designated 4 and 5, which are preferably of magneto-electric construction, and which will hereinafter be termed "terraphones", are provided at each of the stations, and these are adapted to be suitably connected to the input terminals of vacuum tube amplifiers 6 and 7 respectively. From the output terminals of these amplifiers, suitable connections are provided to the terminals of an oscillograph 8. This instrument, as contemplated by the present invention, is provided with two strings, one of which is related to each of the terraphones to control the photographic recording of the vibrations reaching the terraphones. Other accessory equipment is also provided at each of the stations and will be mentioned hereinafter in connection with the explanation which will now be given of the preferred method of operation.

Having adopted a suitable location for the point of explosion O, and having selected desirable locations for the several stations by merely estimating the desired distances, radio compasses for each of the stations will be set up at the selected points which may be designated $a$, $b$, $c$, and $d$.

Antenna equipment 9, provided for each of the stations, will also be located at substantially the same points, except that the antenna for station A will be first located at O, so that signals may be sent out from each station and received by the radio compasses of all of the others. For example, at the sending station the switch 10 will be thrown to the left in Figure 2 in order to place the antenna 9 in the circuit of the radio transmitter. The terminals 11 of the radio transmitter are constantly in circuit with one arm of a switch 12, and a radio signalling key 13, so that upon each depression of this key an impulse or signal will be sent out from the antenna 9 of the sending station which at this time is located at the point of explosion as indicated in dotted outline. In practice, a series of such signals will be sent out during the course of which all of the radio compasses at the points $a$, $b$, $c$, and $d$, will be adjusted until the loops 101 are directed toward the source of the signal. Preferably, as shown in Figure 5, a transit 102 will be employed in conjunction with each radio compass, so that not only the relative direction to the point of explosion may be determined but the precise direction with respect to magnetic north may also be ascertained. For this purpose the transit may first be sighted upon any suitable pair of points on the loop of the compass such as a pair of hair lines 103 formed on pieces of glass mounted on the loop preferably to form a sight line at right angles to the latter. The reading in degrees of a scale 104 secured to the loop, with respect to a fixed mark 105 may then be noted and compared with the reading of a similar scale 106 movable with the telescope 107 of the transit relative to the compass needle 108. A comparison of these readings will determine the position of the loop with relation to magnetic north at that time and its position after subsequent adjustment to locate the source of signal may be definitely determined by comparison of the new reading of the compass scale with the old. If desired, the scale 104 attached to the loop may be made adjustable thereon so that after a bearing has been taken by the transit the compass scale may be adjusted and set by means of a screw 109 to the same reading as the transit scale. In any position of the loop so long as the position of the main body of the radio compass 1 is not disturbed, the bearing with relation to magnetic north may then be directly read from its scale. Having thus determined the radio compass bearings indicated by the lines 14 in the drawings, a line perpendicular to the bearing line at each of the stations, may be determined by swinging the loop through 90° and using the transit if desired and, at a given distance, which is preferably 250 feet, to each side of the point from which the bearing was taken, one of the terraphones may be inserted into the ground. This will insure the location of the terraphones at a distance of—say 500 feet part, and along a line at right angles to and bisected by the compass bearing previously determined.

If desired, each of the stations B, C, and D, may send out radio signals by means of its transmitting apparatus through antenna equipment located at the same points $b$, $c$, and $d$, at which the radio compasses were located. At this time, all of the remaining stations, including the sending station A with its radio compass at the point $a$, may take up their bearings by means of their compasses with respect to the transmitting station. It is only necessary or important that one of the receiving stations be employed in this way to send out signals, although if desired, each station may successively send out signals to be picked up by the compasses of the remaining stations as a check upon the original determinations made. It may be found desirable to locate the terraphones for station A at a somewhat greater distance apart than those for the remaining stations, say 1,000 feet, although this is not essential. In this way, the terraphones for the sending station would form substantially an equilateral triangle with the point O. It will be apparent that the method outlined will result in the determination of all of the angles between the several stations, so that if one of the distances is known or determined with some degree of accuracy, all of the remaining distances may be determined by triangulation. For example, the distance from the point O to the point $a$, may be accurately measured so that with the angles determined in the way indicated, all other distances may be computed, or it may be found simpler to determine the distance between two of the points $b$ and $c$, for example, of the receiving stations.

All of the equipment for each station, will preferably be mounted on an automobile or other means of conveyance, so as to render it easily transportable from one point to another. This will provide an easy, method, furthermore, of determining the distance between stations since the odometer reading may probably be taken with sufficient accuracy for this purpose. It is to be borne in mind that accuracy within one or two per cent in the determination of the location of desired deposits from a known point will be sufficient for the purposes, although, of course, greater accuracy if obtainable is desirable.

Having thus determined the positions of the several stations, and having connected the instruments in the manner shown, as well as having buried the explosive charge in the manner hereinbefore indicated, all is substantially ready for the firing of the explosive and the making of the records which will indicate not only the speed of travel of the compressional waves set up but other characteristics as well. Prior to the discharge of the explosive, radio communication between the stations will determine whether or not all are prepared to take the necessary records. As soon as the sending station has ascertained that all of the remaining stations are prepared, several warning signals will be sent out from the radio transmitter at station A, followed by a signal advising all of the stations to set the oscillographs into operation. This will normally involve the closing of certain electrical circuits and the starting up of the camera mechanism which is adapted to feed a photographic record strip at a uniform rate as will be more fully explained hereinafter. If desired, the oscillograph may already be in operation except for the movement of the film so that the signal may be employed to bring about merely the starting of the camera. Within a fraction of a second, the switch 15 at the sending station will be closed. At the instant of closing this switch a signal will be sent out by means of the radio transmitter 2 in precisely the same manner as if the radio key 13 had been depressed. This is due to the closing of the signal circuit by means of the branch 1 of the switch. All of the radio receivers of the stations, except the sending station, will pick up this signal and by means of the relays 16, whose armatures are operated upon receipt of the signal, will pass it along to one of the strings of the galvanometers forming a part of the oscillographs. For this purpose there is in the relay circuit a battery 17 and a variable resistance 18, together with a primary winding 19 of an induction coil. The resistance 18 may be adjusted to any suitable value in order to produce the desired magnitude of effect upon the galvanometer. A secondary winding 20 of the induction coil is placed in the line from one of the terminals of a terraphone amplifier to one of the strings of the galvanometer and in order to protect the latter still further, a variable resistance 21 is also placed in parallel with this secondary winding. By the means just described, therefore, a record is produced on the photographic film at each of the stations B, C, and D, indicating the precise moment at which the switch 15 was closed. The corresponding record at station A, must be formed in a slightly different way since at this time the switch 10 at this station must place the transmitter rather than the receiver in the antenna circuit. A means for providing the desired record at station A will now be described.

Another circuit which is completed upon the closing of the switch 15, is that which serves to set off the explosive charge. This circuit includes a battery 22 and suitable leads to the explosive charge, and from the latter to the variable resistance 18. Another connection from this resistance completes the circuit to the switch 15. At the sending or central station furthermore, the circuit will be closed through the terminals 23, as by the placing of a shunt directly across the latter, so that the circuit through the point of explosion will be divided at these terminals, a portion of the current being passed through the primary winding 19 and battery 17. It is this portion of the current which will produce a disturbance in the secondary winding 20 upon closing of the switch 15 to provide a record of such closing. It will be apparent that the explosion will not occur at the instant of closing the switch 15, but a short interval of time is required for the electric current to set off the charge. When the explosion actually occurs, the circuit from the battery 22 will be broken and a sudden kickback will take place through the resistance 18 and coil 19, which will produce another record at station A through the secondary winding 20 upon the same string of the galvanometer as previously affected. The time period between the first mark indicating the closing of switch 15 and the actual time of explosion may thus be accurately determined by means of the time marks which, as will be later more fully described, may be made at intervals of 1/100th of a second upon the photographic record of the oscillograph. While the period will be directly indicated only at station A, the correction thus determined may be applied to the record of the closing of the switch at the remaining stations as well.

Upon the exploding of the charge at the point O, a series of compressional waves will be sent out through the surrounding earth in all directions, and these will travel by various courses to the terraphones at the several stations. Some of these waves may travel in a direct line through the upper surface soil of the earth, while others may, in advancing also, travel downwardly to a certain extent until they strike a subterranean mass of different density and elastic qualities than the surface soil. For example, in regions favorable to the accumulation of oil, there will frequently be encountered large salt domes which are of less density than the upper surface soil but which are of considerably greater elasticity than the average surface soil. Assuming that a salt dome is located in the position indicated by the outline designated 24 in Figure 1, certain of the compressional waves will pass downwardly from the source O to the more elastic medium where they will be refracted and through which they will pass at a velocity of four or five times that through the upper surface. After passing for a considerable distance through such a salt dome, the waves will emerge and be again refracted so that they may pass directly through the remaining soil to one of the terraphones at the station B, for example. If the portion of the path of the waves which extends through the more elastic medium 24 is sufficiently great with relation to the total path, these refracted waves may reach the terraphone prior to the direct waves which travel only through the surface soil. There will furthermore be a distinct difference in the amplitude and general form of these waves as reproduced upon the oscillograph record. Still other waves may strike the mass 24 at such an angle as to be reflected from its surface rather than passing into the more elastic medium and being refracted thereby. Instances of this type are illustrated by waves reaching both of the terraphones connected with the station A. Figure 1 illustrates diagrammatically the course which such reflected waves might follow upon striking and rebounding from the surface of the salt dome. Waves of this character are readily distinguishable on the records produced, from waves which have either travelled directly through the surface soil or have been refracted.

From the diagrammatic showing in Figures 1, 2, and 3, it is believed to be clear just how each terraphone upon receipt of a wave will convert it into an electrical impulse which may be amplified by the vacuum tube amplifier 6 or 7, and then sent to one of the two strings of the galvanometer forming a part of the oscillograph. Any suitable type of detector may be employed for the purpose of the conversion mentioned, although a construction of the general type shown in Figure 4 is deemed preferable. This device which may be termed a terraphone comprises a conical casing 25 in the upper end of which there is located an annular laminated member 26 formed of transformer steel. Fitted within the member 26 is an armature 27 formed as a cross and this also is preferably of laminated steel construction. A coil 271 is mounted on each of the four arms of the cross and the terminals of the coils are so joined that when a current from a D. C. source is passed through them two south and two north poles will be established, like poles being opposite each other. The armature is mounted on a rod 28 which extends from the tip of the cone, the construction being such that relative movement is permitted between the cross and the laminated ring 26. It will be apparent that when a compressional wave reaches the casing 25, the latter will be vibrated but the armature, due to its inertia, will tend to remain stationary. This will vary the flux in the magnetic fields set up by the coils 271 and will bring about a variation in the current flowing through these coils. By connecting the coils in the appropriate manner with primary windings of a transformer system, which may form a part of the amplifier units 6 and 7, the combined variations in all of the coils of a terraphone may be amplified and sent through the galvanometer string. For further details as to this type of detector reference may be had to my copending application S. N. 221,520 filed September 23, 1927.

The two records produced by means of the two terraphones 4 and 5, in close proximity upon the photographic strip of the oscillograph, will not only serve as a check upon each other, but will have certain differences in their characteristics which will aid materially in interpreting the course which the emitted waves have followed.

After a lapse of a sufficient period of time which will be a matter of seconds, or such time as may be required for all of the waves which it is desired to record to travel to the several stations, a final signal will preferably be sent out from the sending station by means of the radio key 13 and upon receipt of this signal, the oscillographs and other apparatus at all of the stations may be shut down simultaneously. This procedure will tend to produce uniformity in results at all of the stations, and will also bring about a saving of the film on which the records are produced. The final signal may, if desired, serve as a code designation of the particular explosion recorded since dots and dashes are readily distinguishable on the record. Between the contacts 23 at the several stations there may be inserted a radio key which may be operated at any time to make notation on the related records. Thus each time a new record roll is inserted, it may be marked with the station symbol by the use of such a key. It will be apparent that a comparison of the records from all of the stations, particularly with regard to the differences in the times of travel of the various waves, will provide means for not only indicating the general location of a subterranean deposit, such as a salt dome, but will even serve to give a general indication as to its contour.

A brief description will now be given of one suitable form of recording apparatus or oscillograph.

Referring particularly to Figures 6, 7, 10 and 11, it will be noted that a camera 30 is provided and this may be of any suitable construction along the lines of a small moving-picture camera with constant uniform feed of the film in place of the usual intermittent feed in such cameras. All that is required is suitable mechanism for feeding the record film from a supply roller past a narrow slit toward the front of the camera and onto a storage roller. A spring motor 31 may form a part of the camera for the purpose of operating the film feeding devices. The narrow horizontal slit may be formed in a disc or diaphragm at the rear of a tubular passage 32. A beam of light may be formed by means of a small electric lamp 33 which is suitably mounted within a tube 34. Within this tube there will also be provided suitable condensing lenses which will tend to concentrate the rays of light from the source 33. A smaller tube 35 secured to the tube 34 will preferably be passed through an opening in the pole pieces 36 of an electromagnet which is energized by a coil 37. Additional lenses are carried within the tube 35 and the latter together with the tube 34 is adjustable to obtain a proper focus. It will be understood that the beam of light thus created will be focused upon the film passing the opening 32 of the camera. In the path of this beam of light, which is of relatively flat but wide formation, a pair of galvanometer strings will be held in a vertical plane so that each string will cast a point shadow upon the record film. For this purpose a holder 38 is slidable in grooves formed in blocks 39 secured to the pole pieces of the magnet and this holder, as best shown in Figure 11, carries the two strings 40. Suitable conductors are provided on the holder for connecting the ends of each string to a pair of contacts 400 at the base of the holder and when the latter is inserted, as shown in Figure 7, a pair of contact springs 401 on each side of the holder will engage one of the pairs of contacts 400. In Figure 7 there is shown only one pair of spring contacts 401, which engage the lowermost pair of contacts on the holder 38 and are in turn connected to sockets 402 on the base plate of the instrument. It will be understood that a similar arrangement on the opposite side serves to connect the upper pair of contacts 400 with suitable binding posts or sockets 403 mounted in the base of the oscillograph. The ends of the strings 40 are thus connected to suitable terminals which in turn are connected to the terraphone amplifiers in the manner indicated in Figures 2 and 3. It will be apparent that the strings 40 form an obstruction in the path of the beam of light so that as the photographic strip is moved past the opening 38 a pair of lines unaffected by light will be formed thereon and these will be displayed as white on black in the developed record. When an electrical impulse is imposed upon the strings 40 by means of the terraphones or the radio apparatus they will vibrate and those portions which are in the path of the beam of light will produce a wave line upon the record corresponding to the impulse received. In addition to the record of the movement of the strings, there is formed a time record of intervals of one one-hundredth of a second. For this purpose there is provided a synchronous motor 41 on whose spindle, or geared to which, there is provided an open disk 42 having a series of ten spokes 43. One of these spokes is broken away in part so as to distinguish it from the others. The disk 42 is revolved by the motor so as to carry the spokes successively across the path of the beam of light before mentioned with the result that light is excluded from the film at the proper intervals and a continuous series of transverse lines is formed. Due to the broken away portion of one spoke, every tenth line will be broken to designate tenths of seconds. In order to insure uniformity in the speed of operation of the synchronous motor, the latter is preferably controlled by means of a tuning fork 44 or similar device having a definite frequency. Thus, when the fork is set in vibration by pinching it, two sets of contacts 45 and 46 are successively made and broken. Contacts 46 merely form part of a circuit through a coil 47 of an electro-magnet which serves to supply new power to the fork to keep it in vibration. The set of contacts 45 on the other hand are in the circuit of the synchronous motor and serve to impose the desired frequency upon the latter.

The location of the sending station A on the opposite side of the point of explosion from that on which the stations B, C, and D, are located, serves to provide data for the area in the immediate vicinity of the point of explosion. It is well known that waves of the character set up will penetrate the earth to a distance of approximately one-sixth of the horizontal distance through which it travels, and waves of this type furthermore follow practically a hyperbolic path. For this reason a wave received at any of the stations will only have passed through an elastic deposit, such as 24, at any considerable depth about midway between the point of explosion and the terraphone receiving the wave. At a point relatively close to the point of explosion, a refracted or direct wave will have penetrated to only a relatively short distance so that it is unlikely that any of the stations B, C, or D would indicate a deposit within a few thousand feet, or perhaps a mile of the source and at a depth of five hundred or more feet. However, the terraphones of station A would receive the reflected waves from such a subterranean body so that the usual "dead area" immediately surrounding the point of explosion is eliminated.

Referring to Figure 9, which illustrates a small section of a record such as might be formed at one of the receiving stations, the line 50 represents the record obtained from that string of the oscillograph which may either be affected by the radio apparatus or one of the terraphones while the line 51 represents the record obtained from the remaining string which is affected solely by its related terraphone. The break 52 in line 50 indicates the radio signal sent out upon the closing of the explosion switch 15, while the following break 53 in the opposite direction indicates the opening of this switch. At 54 a sharp break may be observed at the beginning of a series of vibrations of considerable amplitude. This may represent the instant of receipt of the wave caused by the explosion after the wave has traveled down to a considerable depth and has been refracted through a salt dome or similar elastic medium to send it in the direction of the terraphone or other detector. Another sudden break as indicated at 55 may be interpreted as the instant of receipt of the more slowly traveling direct ground wave while still another disturbance beginning at the point 56 may indicate the receipt of a sound wave through the air. The breaks in the line 50 designated by the numerals 57 and 58 will indicate the beginning and end of a dot, for example, sent out by radio from station A as the beginning of a symbol to identify the particular record with a particular explosion. In somewhat similar fashion the line 51 may be broken at the points 59, 60 and 61 to show the time of receipt by its terraphone of the refracted, direct-ground, and air-sound waves respectively. Due to the system of laying out the locations of the terraphones with respect to the point of explosion, the breaks 60 and 61 will be found to coincide pretty well with the breaks 55 and 56 in the line 50 since the length of the paths through which the corresponding waves will have traveled will be substantially the same. On the other hand, the refracted waves picked up by the two detectors at a given station may have traveled through paths of quite different length and character so that the points 54 and 59 will not necessarily coincide. The same would be true in the case of reflected waves included in the record. The time lines 62 represent periodic time intervals of one one-hundredth of a second, while the break 63 in every tenth one of these lines will indicate tenths of seconds. While the foregoing brief discussion of Figure 8 will serve to bring out the possibilities of interpreting the records and the advantage of having the two lines 50 and 51 in close relation on a single record, it will be clear that a careful study and comparison of all of the records produced at the several stations will reveal many interesting facts concerning the subterranean conditions.

Insofar as the present invention is concerned, the specific construction of the various instruments employed is not important so long as they are capable of performing the functions prescribed. Suitable devices are well known which are capable of performing all of the necessary functions. While a single two string galvanometer has been referred to as forming part of the oscillograph, this may, if desired, be replaced by two separate single string galvanometers producing photographic records upon either the same or separate record strips. It has been found advantageous, however, to employ the two string type of galvanometer in such a way that one of the strings may not only record the vibrations detected by a terraphone but may also record the radio impulses in the manner indicated as well as the impulse created upon the explosion of the charge. If the film feeding devices of the oscillograph are sufficiently uniform in action, it will not be necessary to provide in this instrument separate time marking means although it has been found preferable in practice to employ such means to mark the record strip at intervals of one one-hundredth of a second. It has been mentioned as desirable to have all of the apparatus mounted in a car for purposes of ready transportation and convenient use. At the same time, it will be found desirable to so mount the apparatus as to make it easily detachable so that it may be carried into places which may be inaccessible to the car. While a preferred method of, and suitable apparatus for, carrying out the process of surveying the earth's surface has been described, it will be understood that changes may be made in the procedure to be followed without departing from the spirit of the invention. It is desired only to be limited in this respect by the scope of the claims which follow.

The invention herein described may be manufactured and used by or for the Government of the United States for governmental purposes without the payment to me of any royalty thereon or therefor.

What I claim is:

1. The method of exploring the earth's surface which comprises the generation of compressional waves below the surface, and the detection of such waves at a plurality of stations at substantially the same time, some of said stations being arranged in substantially a straight line and at least one of said stations being arranged at a side of the point where the compressional waves are generated opposite from those stations arranged in a straight line.

2. The method of exploring the earth's surface which comprises the generation of compressional waves below the surface, and the detection of such waves at a plurality of stations at substantially the same time, some of said stations being on opposite sides of the source of said waves, and one of said stations being closer to said source than the remaining stations.

3. The method of exploring the earth's surface which comprises the generation of compressional waves below the surface and the detection of such waves at a plurality of stations at substantially the same time, some of said stations being arranged in substantially a straight line at one side of the point where the compressional waves are generated, and at least one of said stations being arranged at the side of said point for the generation of said waves opposite to those stations arranged in a straight line and on a line passing through the point for the generation of said waves and substantially perpendicular to said straight line.

4. The method of exploring the earth's surface which comprises the generation of compressional waves below the surface, detecting said waves at a plurality of points at a distance from the source of said waves, said points being located along a line perpendicular to a line radiating from said source and at equal distances from the point of intersection of said lines, and producing a single common record of the waves detected at all of said points.

5. Apparatus for detecting and recording compressional waves set up in the earth's surface including a plurality of vibration detectors, a recorder having separate record controlling elements for each of said detectors, and means for affecting one of said elements to produce a record at the instant of generation of said waves.

6. Apparatus for detecting and recording compressional waves set up in the earth's surface including a plurality of vibration detectors, a recorder having separate record controlling elements for each of said detectors, and means for affecting one of said elements to produce a record at the instant of generation of said waves, said means and one of said detectors being in constant effective relation with respect to one of said elements.

7. In the method of determining the earth's structure by causing an explosion from a control point and recording the characteristics of the waves thus set up and transmitted to a plurality of receiving stations the steps comprising the emission of a radio signal at the control point upon closing an electric circuit to cause the explosion, the recording of said signal at said receiving stations, and the recording at the control point of the instant of closing said circuit as well as of the instant of explosion.

8. In apparatus for examining the earth's structure by the use of an explosive charge, electrical means for setting off said charge, said means including a control switch, means for recording at a control point and a plurality of receiving stations the instant of closing said switch, and means for recording at said control point the instant of the explosion.

9. In a method of exploring the earth's surface by the generation of compressional waves at one point and the reception of said waves at a plurality of stations, the steps comprising operating a signalling device at said one point and directional signal receiving devices at said stations, adjusting said signal receiving devices to determine their directions with relation to said point, setting up compressional waves, and receiving said waves by detecting devices placed at equal distances on opposite sides of said stations along lines perpendicular to the lines of direction determined.

10. In apparatus for determining earth structure by the study of artificial vibrations, the means for obtaining the relative location of the source and reception points of said vibrations comprising radio transmitters at said source and one of said reception points, radio compasses provided with loops at all of said reception points adapted to determine a bearing relative to said transmitters, and a magnetic compass at each of said reception points adapted to determine the positions of the loops of said radio compasses with respect to magnetic north.

11. Apparatus for determining earth structure by the use of compressional waves, means for generating compressional waves, means for detecting said waves at a point remote from said generating means, means for recording said detected waves, connections between said detecting means and said recording means, a radio transmitting device automatically operable upon the generation of said compressional waves, a radio receiving device, means controlled by said radio receiving device and including a transformer associated with the connections between said detecting means and said recording means for affecting said recording means to produce a record, and separate key operated means for controlling said recording means at will.

HARVEY C. HAYES.